April 18, 1933. W. WITHINGTON 1,904,843
RAKE
Original Filed Oct. 21, 1929
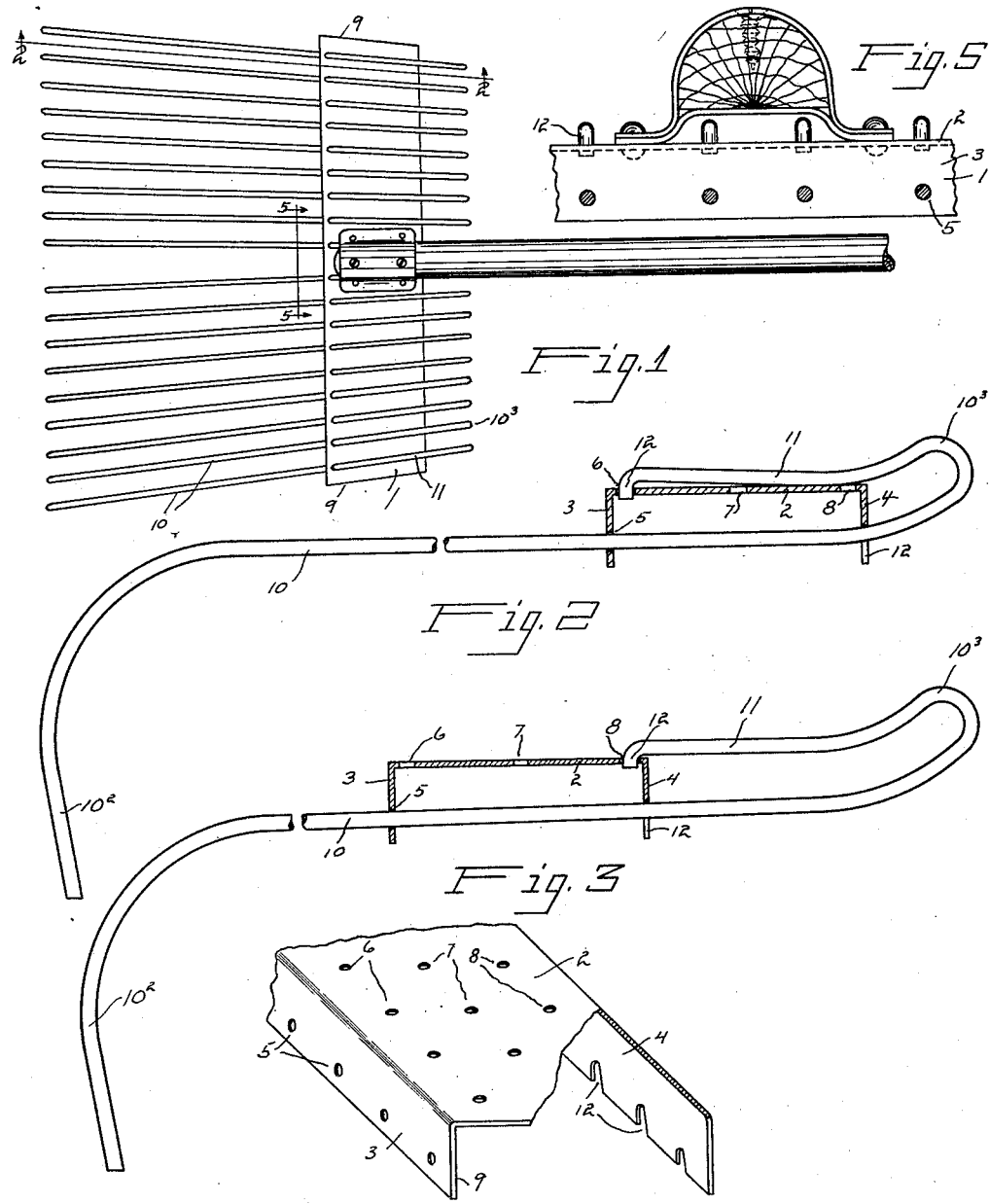
Inventor
Winthrop Withington
By Hooghand Canfield
Attorney Patented Apr. 18, 1933

1,904,843

UNITED STATES PATENT OFFICE

WINTHROP WITHINGTON, OF CLEVELAND, OHIO, ASSIGNOR TO THE AMERICAN FORK & HOE COMPANY, OF CLEVELAND, OHIO, A CORPORATION OF OHIO

RAKE

Application filed October 21, 1929, Serial No. 401,125. Renewed August 26, 1931.

My invention relates to rakes and relates particularly to rakes of the general type commonly employed for raking lawns or for like purposes.

An object of my invention is to provide a rake of the above character wherein the tines are individually mounted in a cross head supported by the forward end of the handle and adapted for individual removal therefrom.

Another object of my invention is to provide a rake wherein the tines are individually removable from the head.

Another object of my invention is to provide an improved rake wherein the tines are individually longitudinally adjustable relative to said head.

Another object of my invention is to provide a rake of inexpensive construction but which will be highly efficient nevertheless and whereby the ready displacement of bent or broken tines may be made.

Other objects of my invention and the invention itself will be apparent by reference to the following description of an embodiment of my invention and which embodiment is illustrated in the accompanying drawing.

Referring to the drawing:—

Fig. 1 illustrates in plan view a rake embodying the principles of my invention, the rearmost portion of the handle being shown as broken away;

Fig. 2 is a sectional view taken on the line 2—2 of Fig. 1;

Fig. 3 is a view corresponding to that of Fig. 2 but with the tine thereof shown as adjusted to a different position of use;

Fig. 4 is an isometric view of the rake cross head of the foregoing figures.

Fig. 5 is a view in front elevation of the rake of Fig. 1, the forward portions of the tines being shown as broken away.

Referring now to all of the figures of drawing in all of which like parts are designated by like reference characters:—

At 1 I show a tine supporting cross head of inverted channel form having an upper wall 2 and front and rear walls 3 and 4 respectively. The front wall 3 is provided with a row of apertures 5 substantially equally spaced from each other and provided at intervals from adjacent the one lateral edge 9 of the cross head to the other lateral edge 9 thereof.

In like manner the upper wall 2 is provided with a plurality of rows of apertures 6, 7 and 8, the row 6 being more forwardly and the row 8 more rearwardly disposed than the intermediate row 7. The apertures 5, 6, 7 and 8 are all of such diameters as to freely receive therethrough the wire tines 10.

A plurality of tines 10 are provided preferably equal in number to the apertures of each row. The tines 10 are each provided with an intermediate longitudinally extending portion which terminates at its forward end in a down turned prong end $10^2$ and at its opposite rear end it terminates in a resilient loop $10^3$ providing a short arm 11 extending substantially parallel with the longer arm 10 forming the tine proper.

The short arm 11 terminates in a short hook 12 turned inwardly toward the longer arm. Figs. 2 and 3 illustrate a tine 10 having the arms formed by the loop $10^3$ resiliently spread apart by the interposed portion of the cross head 1 which by the resiliency of the loop is resiliently held between the arms.

The rear wall 4 of the channeled cross head is provided with a series of notches 12 extending from its lower edge upwardly these notches being like in number to the apertures of the different rows above mentioned, there being an aperture in longitudinal alignment with each one of the notches 12.

The tines may be secured to the cross head by projecting the tip ends $10^2$ first through the apertures 5 then spreading the long and short arms of the tine apart lifting the hook 12 over the upper wall 2 of the cross head, then letting it snap into any one of the apertures 6, 7 or 8, into which it will be held by the resiliency of the steel or other metallic tine material of which the tines are composed.

By virtue of the above arrangement, the tines may be readily adjusted from one position to another as the need for such adjustment may occur, depending on the kind of work being done, or removed entirely or new tines inserted, and the rakes may be shipped in disassembled condition and easily reassembled at point of destination.

The short arms 11 are adapted to be grasped manually with ease being exterior to the wall 2 throughout their length, so that the tines may be made of relatively heavy wire since a firm grasp upon the tines for adjustment purposes may be had.

The apertures 5 particularly are desired to be made sufficiently small in size that the tines will not fit too loosely therein to prevent rattling of the ends of the tines in the channeled cross head, the provision of notches 12 instead of apertures through the rear wall is of considerable advantage in inserting the tines in the cross head since otherwise the abruptness of curvature of the down turned tips $10^2$ would be unduly limited.

Having thus described my invention in a particular embodiment, I am aware that numerous and extensive departures may be made from the embodiment herein illustrated and described, but without departing from the spirit of my invention.

I claim:

1. In a rake, a cross head in the form of a channel having a pair of relatively angularly disposed walls and a web portion, one of the walls provided with a row of perforations, a plurality of tines provided with looped rear ends each projected through one of said perforations, the free arm of each tine loop spring pressed from without the channel into a perforation cooperatively formed in the web portion of the channel by its inherent resiliency, to prevent displacement of the inserted tine relative to the cross head.

2. In a rake, a channeled cross head therefor, wire tines carried thereby, said cross head having in the position of use of the rake an intermediate upper wall and end walls pendant therefrom, the forwardly disposed one of said pendant walls provided with a series of apertures disposed from one end to the other end of the wall, the rearmost pendant wall provided with a series of notches extending from its lower edge disposed in lateral alignment from one end to the other end of such rear wall, said upper wall provided with a series of apertures each in longitudinal alignment with the aperture of the front wall and a notch of the rear wall, said tines each terminating at their rear ends in loops to provide a relatively short retaining arm, the other arm projecting forwardly through one of said notches and the aperture of the front wall in alignment therewith, said retaining arm terminating in an inwardly turned hook, said intermediate upper wall having for each of the tines a plurality of reatively longitudinally disposed spaced apertures, each interchangeably adapted to receive said hook.

3. In a rake, a cross head of channel form, a plurality of tines each adapted to be projected through front and rear walls of said cross head and provided at its rear end with a resilient loop providing a short retaining arm for the tine, adjoining portions of the cross head interposed therebetween and resiliently spreading the arms of the tine, and means restraining longitudinal movement of the tines relative to the cross head.

4. In a rake, a cross head of channel form, a plurality of tines each adapted to be projected through front and rear walls of said cross head and provided at its rear end with a resilient loop providing a short retaining arm for the tine, adjoining portions of the cross head interposed therebetween and resiliently spreading the arms of the tine, and means comprising an inwardly deflected portion of one of the arms engageable with the cross head to restrain longitudinal movement of the tine relative to the cross head.

5. In a rake, a head therefor, a plurality of tines carried thereby, each terminating at its rear end in a loop adapted for engagement with the head, said head member being so formed as to engage a forwardly projected prong of each of said tines in a plurality of longitudinal spaced points, and adapted for engagement by the free end of the loop and resiliently distending said loop, and having a portion resiliently clamped between the arms thereof, said last named loop, arms, and said head adapted to make interlocking resiliently maintained engagement to prevent longitudinal displacement of the tine relative to the head.

6. In a rake, a handle, a head supported at an end thereof and extending transversely thereto, said head comprising a pair of front and rear transversely extending elements, a plurality of tines supported by the head, each projected through both said elements and comprising an integrally formed loop projected rearwardly of the rearmost element, the arms of said loop resiliently compressively engaging said head therebetween to retain the tines thereon.

7. In a rake, a handle, a head supported at an end thereof and extending transversely thereto, a plurality of tines each projected through the head and supported thereby and comprising an integrally formed loop projecting rearwardly from the head, the tine constituting one arm of the loop, and the arm of the loop resiliently compressively embracing the head between the arms to retain the tines against longitudinal shifting of the head.

8. In a rake, a handle, a head supported at an end thereof and extending transversely thereto, a plurality of tines longitudinally slidably supported on the head and each comprising a loop projected rearwardly from the head, the tine constituting one arm of the loop, said loop arms resiliently compressively engaging the head between the arms to prevent longitudinal shifting of the tines on the head.

9. A rake comprising a handle, a cross head of angular cross sectional form supported thereby, and provided with aligned pairs of notches and apertures through opposite walls thereof, a plurality of wire tines each projected through an aperture of a forwardly disposed wall of the cross head and terminating at its rear end in a loop providing a short forwardly extending retaining arm, said loop substantially embracing the cross head interposed therebetween, said cross head resiliently spreading the loop arms, said arm terminating in an inwardly turned hook projected through a perforation of another wall to retain the tine in a given longitudinal position relative to the handle and cross head.

10. A rake comprising a handle, a cross head of angular cross sectional form supported thereby, and provided with aligned pairs of notches and apertures through opposite walls thereof, a plurality of wire tines each projected through an aperture of a forwardly disposed wall of the cross head and terminating at its rear end in a loop providing a short forwardly extending retaining arm, said loop substantially embracing the cross head interposed therebetween, said cross head resiliently spreading the loop arms, said arm terminating in an inwardly turned hook projected through a selected one of a plurality of perforations of another wall to adjustably retain the tine in a given longitudinal position relative to the handle and cross head.

11. A rake comprising a handle, a cross head of angular cross sectional form supported thereby, and provided with aligned pairs of notches and apertures through opposite walls thereof, a plurality of wire tines each projected through an aperture of a forwardly disposed wall of the cross head and terminating at its rear end in a loop providing a short forwardly extending retaining arm, said loop substantially embracing the cross head interposed therebetween, said cross head resiliently spreading the loop arms, said arm terminating in an inwardly turned hook, another wall provided with a series of apertures each in longitudinal alignment with the aperture of said front wall, said hook projected through a selected one of a plurality of perforations of the said other wall to adjustably retain the tine in a given longitudinal position relative to the handle and cross head.

In testimony whereof I hereunto affix my signature this 2nd day of October, 1929.

WINTHROP WITHINGTON.